US006037095A

United States Patent [19]

Miyasaka

[11] Patent Number: 6,037,095

[45] Date of Patent: Mar. 14, 2000

[54] NON-AQUEOUS LITHIUM ION SECONDARY BATTERY

[75] Inventor: Tsutomu Miyasaka, Kanagawa, Japan

[73] Assignee: Fuji Photo Film Co., Ltd., Kanagawa, Japan

[21] Appl. No.: 09/050,075

[22] Filed: Mar. 30, 1998

[30] Foreign Application Priority Data

Mar. 28, 1997 [JP] Japan .................................... 9-077180

[51] Int. Cl.[7] ...................................................... H01M 4/58

[52] U.S. Cl. ....................... 430/218.1; 430/221; 430/223; 430/224; 430/225; 430/226; 430/231.5; 430/231.6; 430/231.7; 430/231.95

[58] Field of Search ............................... 429/223, 231.95, 429/231.6, 225, 226, 224, 221, 231.5, 213, 231.7, 218.1

[56] References Cited

U.S. PATENT DOCUMENTS 5,478,674 12/1995 Miyasaka ............................. 429/218.1
5,674,645 10/1997 Amatucci et al. ....................... 429/224
5,750,288 5/1998 Xie et al. ................................ 429/229
5,773,168 6/1998 Kubo et al. ............................. 429/223
5,871,863 2/1999 Miyasaka ............................. 429/218.1

*Primary Examiner*—Maria Nuzzolillo
*Assistant Examiner*—Laura Weiner
*Attorney, Agent, or Firm*—Sughrue, Mion, Zinn, Macpeak & Seas, PLLC

[57] ABSTRACT

A non-aqueous lithium ion secondary battery is composed of a positive electrode, a negative electrode, and non-aqueous electrolyte. In the battery, the positive electrode is composed of an positive electrode active material of the formula: $Li_xNi_{1-y}M_yO_{2-z}X_a$ in which M is at least one element such as Mg, Ca, B, Al, Ga, In, Si, Sn, Ge, Pb and at least one transition metal element; X is a halogen atom; x, y, z and a are numbers satisfying the conditions of $0.2<x\leqq1.2$, $0<y\leqq0.5$, $0\leqq z\leqq1$ and $0\leqq a\leqq 2z$, and the negative electrode is composed of amorphous metal complex oxide or a combination of crystalline and/or amorphous metal complex oxide and carbonaceous material.

7 Claims, 1 Drawing Sheet

FIGURE
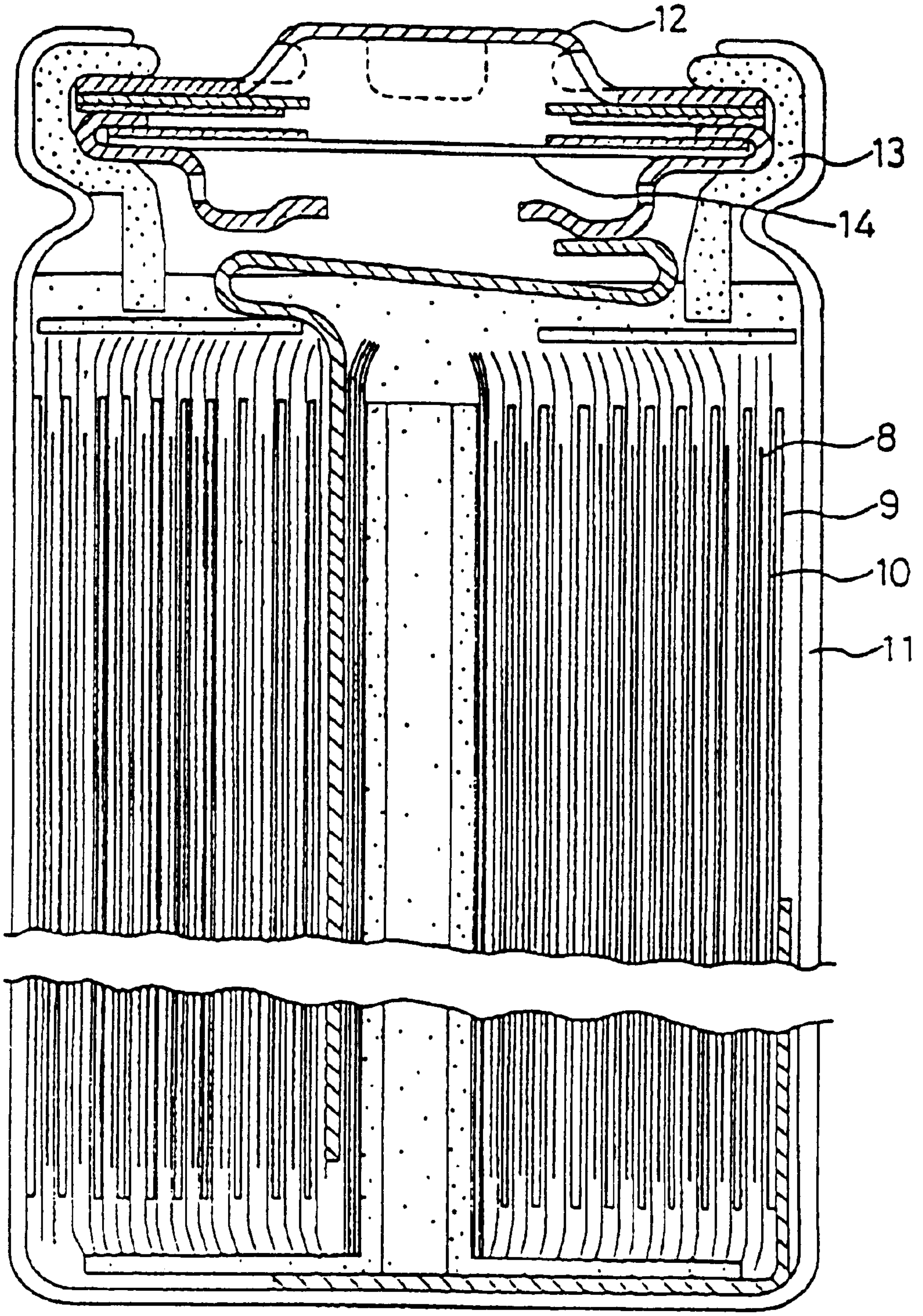

NON-AQUEOUS LITHIUM ION SECONDARY BATTERY

FIELD OF THE INVENTION

This invention relates to a non-aqueous lithium ion secondary battery having a high discharge capacity.

BACKGROUND OF THE INVENTION

As a non-aqueous lithium ion secondary battery for general use, a "rocking chair type" battery (which comprises a combination of lithium ion retaining/releasing materials) is widely employed in these days. The battery generally comprises a negative electrode of one or more of various carbonaceous materials (negative electrode active material) to which lithium ions can be reversibly intercalated, and a positive electrode of lithium-containing metal complex oxide (positive electrode active material) which can reversibly capture and release lithium ions.

As the positive electrode active materials, $LiCoO_2$, $LiCo_{1-x}Ni_xO_2$, $LiNiO_2$ and $LiMn_2O_4$ have been generally employed. $LiCoO_2$ is advantageously used because it gives a high voltage of more than 3.5 volts in combination of Li, and a high discharge capacity (shown in Japanese Patent Provisional Publication No. 55-136131). Japanese Patent Provisional Publications H3-147276 and H4-123769 disclose a secondary battery comprising a positive electrode active material of $LiMn_2O_4$. Since manganese is less expensive and easily available than cobalt, the disclosed battery can be produced at a relatively low cost.

As the carbonaceous material for negative electrode active materials, graphite material, pitch coke, fibrous carbon, and soft carbon obtained by low temperature firing are known. However, since the carbonaceous material generally has a low bulk density of less than 2.20, the resultant battery shows a low discharge capacity even if the material is made to retain lithium ions at the stoichiometric maximum of intercalating capacity (372 mAh/g). In order to solve the problem, some publications propose negative electrode active materials of amorphous metal complex oxide mainly comprising tin oxide (Japanese Patent Provisional Publications No. H6-60867, No. H7-220721, No. H7-122274 and No. H7-288123, and PCT WO96-33519).

The above-mentioned amorphous metal complex oxide (negative electrode active material) in combination with cobalt oxide (positive electrode active material) gives a battery of high energy density, but thus composed battery is considerably expensive. On the other hand, a battery comprising a negative electrode of the amorphous metal complex oxide and a positive electrode of manganese oxides has good cost performance, but its energy density is considerably small.

Published European Patent Application No. 0651450 discloses a battery comprising a negative electrode of the amorphous metal complex oxide and a positive electrode of nickel oxide (such as $LiNiO_2$ and $Li_xCo_aNi_{1-a}O_2$). According to the above publication, the battery comprising the nickel oxide has both good cost performance and a high discharge capacity. However, the battery employing $LiNiO_2$ (basic component of the positive electrode of nickel oxides) generally has such drawbacks that the average discharge voltage is lower than that of the battery using $LiCoO_2$ by 0.2 volt or more, and that its cycle capacity retention is relatively poor. Because of the low discharge voltage, $LiNiO_2$ cannot effectively work in the low voltage range so that the capacity of the battery is restricted to an unsatisfactory level.

Accordingly, it is an object of the present invention to provide a non-aqueous lithium ion secondary battery having both high discharge capacity and good cost performance.

SUMMARY OF THE INVENTION

In one aspect, the present invention resides in a non-aqueous lithium ion secondary battery which comprises a positive electrode comprising an active material of lithium-containing metal complex oxide, a negative electrode comprising amorphous metal complex oxide, and a non-aqueous electrolyte, wherein the lithium-containing metal complex oxide is a lithium-containing nickel metal complex oxide of the following formula (I):

$$Li_xNi_{1-y\,My}O_{2-z}X_a \qquad (I)$$

wherein M represents at least one element selected from the group consisting of Mg, Ca, B, Al, Ga, In, Si, Sn, Ge, Pb and transition metal elements; X is a halogen atom; and x, y, z and a are numbers satisfying the conditions of $0.2<x\leqq1.2$, $0<y\leqq0.5$, $0\leqq z\leqq1$ and $0\leqq a\leqq2z$, respectively.

In another aspect, the invention resides in a nonaqueous lithium ion secondary battery which comprises a positive electrode comprising an active material of lithium-containing metal complex oxide, a negative electrode comprising carbonaceous material and at least one metal complex oxide, and a non-aqueous electrolyte, wherein the lithium-containing metal complex oxide is a lithium-containing nickel metal complex oxide of the following formula (I):

$$Li_xNi_{1-y}M_yO_{2-z}X_a \qquad (I)$$

wherein M represents at least one element selected from the group consisting of Mg, Ca, B, Al, Ga, In, Si, Sn, Ge, Pb and transition metal elements; X is a halogen atom; and x, y, z and a are numbers satisfying the conditions of $0.2<x\leqq1.2$, $0<y\leqq0.5$, $0\leqq z\leqq1$ and $0\leqq a\leqq2z$, respectively.

BRIEF DESCRIPTION OF THE DRAWING

FIGURE is a schematic sectional view of a typical non-aqueous lithium ion secondary battery according to the invention.

DETAILED DESCRIPTION OF THE INVENTION

Preferred embodiments of the invention are as follows.

(1) In the formula (I), "z" and "a" are numbers satisfying the conditions of $0.01\leqq z\leqq0.25$ and $0.02\leqq a\leqq0.5$, respectively.

(2) In the formula (I), "M" represents one or more elements selected from the group consisting of Mg, B, Al, Sn, Si, Ga, Mn, Fe, Ti, Nb, Zr, Mo and W.

(3) In the formula (I), "M" represents a combination of Co and at least one element selected from the group consisting of Mg, B, Al, Sn, Si, Ga, Mn, Fe, Ti, Nb, Zr, Mo and W.

(4) In the formula (I), "M" represents a combination of 10–95 atomic % of Co and 5–90 atomic % of at least one element selected from the group consisting of Mg, B, Al, Sn, Si, Ga, Mn, Fe, Ti, Nb, Zr, Mo and W.

(5) The amorphous metal complex oxide comprises a combination of a major amount of tin oxide as a main component and a minor amount of at least one element selected from the group consisting of transition metal elements, halogen, and the elements belonging to the groups 1, 2, 13, 14 and 15 of the periodic table (such as Na, K, Mg, Ca, Sr, Ba, B, Al, Ga, In, Si, Ge, Sn, Pb, P, AS, Sb and Bi).

(6) The above-mentioned amorphous metal complex oxide is obtained by intercalating lithium ions into an amorphous negative electrode active material precursor of the formula $Sn_xM^1_{1-x}M^2_yO_z$ (wherein "$M^1$" represents one or more elements selected from the group consisting of Mn, Fe, Pb and Ge; "$M^2$" represents two or more elements selected from the group consisting of Al, B, P, Si, halogen, and the elements belonging to the groups 1, 2 and 13 of the periodic table; and "x", "y" and "z" are numbers satisfying the conditions of $0<x\leqq 1.0$, $1\leqq y\leqq 3$ and $1\leqq z\leqq 8$, respectively).

(7) The carbonaceous material is contained in the negative electrode in an amount of 10 to 70 weight %, preferably 20 to 50 weight %.

(8) The metal complex oxide for negative electrode active material comprises at least two metal complex oxides.

(9) The metal complex oxide for negative electrode active material comprises at least one crystalline metal oxide complex oxide and at least one amorphous metal complex oxide.

(10) The non-aqueous electrolyte comprises ethylene carbonate, and $LiPF_6$.

(11) The non-aqueous electrolyte comprises ethylene carbonate, diethyl carbonate, and $LiPF_6$.

(12) The non-aqueous electrolyte comprises ethylene carbonate, dimethyl carbonate, and $LiPF_6$.

(13) In the formula (I), "X" represents fluorine atom.

The non-aqueous lithium ion secondary battery of the invention comprises a positive electrode active material, a negative electrode active material, and non-aqueous electrolyte containing lithium salt, and is characterized by having a high discharge capacity as compared with a conventional non-aqueous lithium ion secondary battery employing a simple carbonaceous negative electrode active material. The high capacity of the invention is given by the specific combination of the positive and negative electrode active materials.

The negative electrode active material can be prepared inside or outside of the battery cell. The inside preparation is performed by electrochemically intercalating lithium ions into a negative electrode active material precursor of metal complex oxide inside of the battery cell.

As the positive electrode active material, lithium-containing nickel complex oxide is employed. The lithium-containing nickel complex oxide preferably used for the invention can be prepared, outside of the battery cell, by doping dopant elements into the basic substance ($LiNiO_2$ having layer structure), to form a solid solution of lithium-containing nickel complex metal oxide.

With respect to the lithium-containing nickel-metal complex oxide employed as the positive electrode active material, a detailed description is given below.

In one aspect, the positive electrode active material for the non-aqueous lithium ion secondary battery according to the present invention is a lithium-containing nickel complex oxide having the following formula (I):

$$Li_xNi_{1-y}M_yO_{2-z}X_a \quad (I)$$

In the formula (I), "M", represents at least one metal or semimetal element which partially substitutes for Li and/or Ni of $LiNiO_2$. "M" represents one or more elements selected from the group consisting of transition metal elements and the elements belonging to the groups 2, 13 and 14 of the periodic table (e.g., Mg, Ca, B, Al, Ga, In, Si, Sn, Ge, and Pb); "X" is a halogen atom; "x", "y", "z" and "a" are numbers satisfying the conditions of $0.2<x\leqq 1.2$, $0<y\leqq 0.5$, $0\leqq z\leqq 1$ and $0\leqq a\leqq 2z$, respectively. When "M" comprises two or more elements, "y" means a total number for these elements. By introducing "M" into $LiNiO_2$, the charge-discharge characteristics such as average discharge voltage and cycle capacity retention are remarkably improved.

In a preferred embodiment of the formula (I), "M" represents one or more elements selected from the group consisting of transition metal elements and the elements belonging to the groups 13 and 14 of the periodic table; "X" is a halogen; "x", "y", "z" and "a" are numbers satisfying the conditions of $0.2<x\leqq 1.2$, $0<y\leqq 0.5$, $0.01\leqq z\leqq 0.25$ and $0.02\leqq a\leqq 0.5$, respectively.

In another preferred embodiment of the formula (I), "M" represents one or more elements selected from the group consisting of Mg, B, Al, Sn, Si, Ga, Mn, Fe, Ti, Nb, Zr, Mo and W; "X" is a halogen; "x", "y", "z" and "a" are numbers satisfying the conditions of $0.2<x\leqq 1.2$, $0.01\leqq y\leqq 0.5$, $0\leqq z\leqq 1$, and $0\leqq a\leqq 2$, respectively.

In a further preferred embodiment of the formula (I), "M" represents one or more elements selected from the group consisting of Mg, B, Al, Sn, Si, Ga, Mn, Fe, Ti, Nb, Zr, Mo and W; "X" is a halogen; "x", "y", "z" and "a" are numbers satisfying the conditions of $0.2<x\leqq 1.2$, $0.01\leqq y\leqq 0.5$, $0.01\leqq z\leqq 0.25$ and $0.02\leqq a\leqq 0.5$, respectively.

In any of the above embodiments, "X" preferably is fluorine.

In another aspect, the positive electrode active material for the non-aqueous lithium ion secondary battery according to the invention is a lithium-containing nickel/cobalt complex oxide having the following formula (II):

$$Li_xNi_{1-y}Co_{y-k}M_kO_{2-z}X_a \quad (II)$$

In the formula (II), "M" represents at least one metal or semimetal element which partially substitutes for Li and/or Ni of $LiNiO_2$. "M" represents one or more elements selected from the group consisting of transition metal elements and the elements belonging to the groups 2, 13 and 14 of the periodic table (e.g., Mg, Ca, B, Al, Ga, In, Si, Sn, Ge, and Pb); "X" is a halogen atom; "x", "y", "k", "z", and "a" are numbers satisfying the conditions of $0.2<X\leqq 1.2$, $0<y\leqq 0.5$, $k<y$, $0<k<0.5$, $0\leqq z\leqq 1$ and $0\leqq a\leqq 2z$, respectively. When "M" comprises two or more elements, "k" means a total number for these elements. By introducing "M" and Co into $LiNiO_2$, the charge-discharge characteristics such as average discharge voltage and cycle capacity retention are remarkably improved.

In a preferred embodiment of the formula (II), "M" represents one or more elements selected from the group consisting of transition metal elements and the elements belonging to the groups 13 and 14 of the periodic table; "X" is a halogen; "x", "y", "k", "z" and "a" are numbers satisfying the conditions of $0.2<x\leqq 1.2$, $0<y\leqq 0.5$, $k<y$, $0<k<0.5$, $0.01\leqq z\leqq 0.5$, and $0.01\leqq a\leqq 0.5$, respectively.

In another preferred embodiment of the formula (II), "M" represents one or more elements selected from the group consisting of Mn, Fe, Ti, B, Al, Sn, Si, Ga, and Mg; "X" is a fluorine atom; "x", "y", "k", "z" and "a" are numbers satisfying the conditions of $0.2<x\leqq 1.2$, $0.01\leqq y\leqq 0.5$, $k<y$, $0<k<0.5$, $0.01\leqq z\leqq 0.5$, and $0.1\leqq a\leqq 2z$, respectively. "M" most preferably is Mn, B, Al and/or Si. "k" preferably is a number defined by $0.01\leqq k\leqq 0.5$, more preferably $0.01\leqq k\leqq 0.3$.

The lithium-containing nickel metal complex oxide of the invention can be obtained by the steps of: mixing a lithium compound (lithium source), a nickel compound (nickel source) and a metal compound containing "M" such as Co, Mg, B, Al, Sn, Si, Ga, Mn, Fe, Ti, Nb, Zr, Mo and W ("M" source); and then firing the mixture at high temperatures or causing a reaction in the mixed compounds in accordance with sol-gel method.

Examples of the lithium compounds (i.e., lithium sources) include LiOH, $Li_2CO_3$, $Li_2O$, $LiNO_3$, $Li_2SO_4$, $LiHCO_3$, $Li(CH_3COO)$, and alkyl lithium. Examples of the nickel compounds (nickel sources) include NiO, $NiCO_3$, $Ni(NO_3)_2$, Ni powder, $NiCl_2$, $NiSO_4$, $Ni_3(PO_4)_2$, $Ni(CH_3COO)_2$, $Ni(OH)_2$, NiOOH and Ni alkoxide. Examples of the compounds containing "M" ("M" sources) include $Co_2O_3$, $Co_3O_4$, $CoCO_3$, $Co(NO_3)_2$, $CoCl_2$, $MnCO_3$, $MnO_2$, $Mn(NO)_3$, $B_2O_3$, $B(OH)_3$, $Al_2O_3$, $Al(NO_3)_3$, $Al(OH)_3$, $SnO_2$, SnO, $SnCl_2$, Sn alkoxide, $SiO_2$, SiO, alkoxy silane, $Mg(OH)_2$, $MgCO_3$, $MgCl_2$, $Fe_2O_3$, $FeCl_3$, FeOOH, $Fe(NO_3)_3$, $TiO_2$, $GeO_2$, $ZrO_2$, $Nd_2O_3$, $La_2O_3$, BaO, $SrCO_3$, $Zn(NO_3)_2$, $WO_3$, $Ga(NO_3)_2$, CuO, $V_2O_5$, $Sm_2O_3$, $Y_2O_3$, $AlF_3$, $BaF_2$, LiF, $LaF_3$, $SnF_2$, $Li_3PO_4$, $AlPO_4$, $Cs_2CO_3$, $Ca(OH)_2$ and $Na_2CO_3$. The above-mentioned sources can be mixed in the form of a dry powder, otherwise they can be dissolved or dispersed in an appropriate solvent and dried to prepare a dry mixture or a slurry mixture.

In the case that the complex oxide is prepared by firing, the mixture is fired in the presence of oxygen at a temperature of 400 to 1,000° C., preferably 600 to 900° C., for 4 to 48 hours. The partial pressure of oxygen is preferably controlled at not less than 0.2 atm, more preferably not less than 0.5 atm. The firing can be carried out twice or more. Prior to the firing, the mixture can be molded into pellets. The firing process can be carried out, for example, in accordance with the following methods: powder mixing method (described in Japanese Patent Provisional Publications 62-264560, H2-40861, H6-267538 and H6-231767), solution mixing method (described in Japanese Patent Provisional Publications H4-237953, H5-325966 and H6-203834), co-precipitation method (described in Japanese Patent Provisional Publication 63-211565), rapid quenching method (described in Japanese Patent Provisional Publications H5-198301 and H5-205741), pellets firing method (described in Japanese Patent Provisional Publications H5-283076 and H6-310145), melt firing method using LiOH hydrate (described in Japanese Patent Provisional Publication H5-325969), method of firing under a restricted partial pressure of oxygen (described in Japanese Patent Provisional Publication H6-60887), fluorine doping method (described in Japanese Patent Provisional Publication H6-243871), and method for preparing an active material in which the composition of the surface is different from that of the inside (described in Japanese Patent Provisional Publication H8-138670).

Other than Li, Ni and "M" such as Co, the positive electrode active material can contain one ore more impurities such as Fe, Cu, Ca, Na and/or sulfate radical ($SO_4$) in amounts of not more than 0.01% (each of Fe and Cu) and not more than 0.05% (each of Ca, Na and $SO_4$). The amount of water contained in the active material preferably is not more than 0.1%.

The mean grain size of the positive electrode active material preferably is in the range of 1 to 30 μm, more preferably 3 to 15 μm (in terms of secondary particle size), or 0.1 to 1 μm, more preferably 0.1 to 0.5 μm (in terms of primary particle size). The term "secondary particle" here means a particle consisting of aggregated primary particles, and the mean grain size usually determined by grain size distribution measurement, for example by means of laser scattering. The secondary particle preferably has a spherical shape and a porous surface.

The specific surface area of the active material determined by BET method preferably is in the range of 0.1 to 10 $m^2/g$, more preferably 0.3 to 3 $m^2/g$. The tap density is preferably in the range of 2.3 to 2.9 $g/m^2$, more preferably 2.5 to 2.8 $g/m^2$.

The positive electrode active material of the invention may be crystalline or partially amorphous, but crystalline particles are preferred. In the case that the particles are crystalline, the lattice constants preferably are in the ranges of 2.81 to 2.91 (a-axis) and 13.7 to 14.4 (c-axis). The ratio of the diffraction intensity assigned to (104) face, based on that assigned to (003) face, preferably is in the range of 0.1 to 0.9, more preferably 0.3 to 0.8. Preferably, the diffraction lines corresponding to the starting materials (such as lithium carbonate and nickel oxide) and impurities produced by side reaction are not observed.

Preferred examples of the positive electrode active materials according to the invention are concretely shown below:

| | |
|---|---|
| $LiNi_{0.95}B_{0.05}O_2$ | $LiNi_{0.92}Al_{0.08}O_2$ |
| $LiNi_{0.98}Mg_{0.02}O_2$ | $LiNi_{0.95}Ga_{0.05}O_2$ |
| $LiNi_{0.90}Mn_{0.10}O_2$ | $LiNi_{0.90}Mn_{0.07}B_{0.03}O_2$ |
| $LiNi_{0.90}Mn_{0.07}B_{0.03}O_{1.95}F_{0.1}$ | $LiNi_{0.92}Sn_{0.08}O_2$ |
| $LiNi_{0.97}Si_{0.03}O_2$ | $LiNi_{0.9}Cu_{0.1}O_2$ |
| $LiNi_{0.9}Zn_{0.1}O_2$ | $LiNi_{0.95}Zr_{0.05}O_2$ |
| $LiNi_{0.95}P_{0.05}O_2$ | $LiNi_{0.90}Fe_{0.10}O_2$ |
| $LiNi_{0.95}Ti_{0.05}O_2$ | $LiNi_{0.95}Tb_{0.05}O_{1.95}F_{0.1}$ |
| $LiNi_{0.95}Zr_{0.95}O_{1.95}F_{0.1}$ | $LiNi_{0.95}Mo_{0.05}O_{1.95}F_{0.1}$ |
| $LiNi_{0.95}W_{0.95}O_{0.195}F_{0.1}$ | $LiNi_{0.95}Ge_{0.05}O_2$ |
| $LiNi_{0.97}Sm_{0.03}O_2$ | $LiNi_{0.7}Co_{0.26}B_{0.04}O_2$ |
| $Li_{1.03}Ni_{0.67Co0.26}B_{0.04}O_2$ | $LiNi_{0.7}Co_{0.3}O_{1.9}F_{0.2}$ |
| $LiNi_{0.7}Co_{0.26}B_{0.04}O_{1.9}F_{0.2}$ | $LiNi_{0.7}Co_{0.26}A1_{0.04}O_2$ |
| $LiNi_{0.7}Co_{0.26}Al_{0.04}O_{1.9}F_{0.2}$ | $Li_{1.03}Ni_{0.67}Co_{0.26}Al_{0.04}O_{1.9}F_{0.02}$ |
| $LiNi_{0.7}Co_{0.28}Mg_{0.02}O_2$ | $LiNi_{0.7}Co_{0.25}Ga_{0.05}O_2$ |
| $LiNi_{0.80}Co_{0.10}Mn_{0.10}O_2$ | $LiNi_{0.80}Co_{0.10}Mn_{0.07}B_{0.03}O_2$ |
| $LiNi_{0.08}Co_{0.10}Mn_{0.07}B_{0.03}O_{0.95}F_{0.05}$ | $LiNi_{0.75}Co_{0.15}Zn_{0.1}O_2$ |
| $Li_{1.03}Ni_{0.67}Co_{0.10}Mn_{0.07}B_{0.03}O_{0.95}F_{0.05}$ | $LiNi_{0.7}Co_{0.25}Ti_{0.05}O_2$ |
| $LiNi_{0.75}Co_{0.01}Cu_{0.1}O_2$ | $LiNi_{0.75}Co_{0.22}Si_{0.03}O_2$ |
| $LiNi_{0.7}Co_{0.20}F4_{0.10}O_2$ | $LiNi_{0.7}Co_{0.25}P_{0.05}O_2$ |
| $LiNi_{0.75}Co_{0.17}Sn_{0.08}O_2$ | $LiNi_{0.7}Co_{0.27}Sm_{0.03}O_2$ |
| $LiNi_{0.7}Co_{0.25}Zr_{0.05}O_2$ | |
| $LiNi_{0.7}Co_{0.25}Ge_{0.05}O_2$ | |
| $LiNi_{0.80}Co_{0.15}B_{0.03}Al_{0.02}O_2$ | |
| $Li_{1.03}Ni_{0.77Co0.15}B_{0.03}Al_{0.02}O_2F_{0.1}$ | |

The negative electrode active material for the battery according to the present invention is a metal complex oxide having an amorphous structure or a composition composed of a metal complex oxide (amorphous or crystalline) and carbonaceous material. Since any of these negative electrode active material has a large capacity to retain lithium ions therein, it can give a battery of a high capacity when used in combination with the abovementioned positive electrode active material of lithium-containing nickel complex oxide.

The carbonaceous material employable for the negative electrode active material in the invention can be a graphite type carbonaceous material or a non-graphite type carbonaceous material. Examples of the carbonaceous materials include carbonaceous materials having a variety of face-to-face distances, density values and crystallite sizes (described in Japanese Patent Provisional Publications 62-122066, H2-66856, H3-245473, etc.); a mixture of natural graphite and synthesized graphite (described in Japanese Patent Provisional Publication 5-290844); carbonaceous materials grown in gaseous phase (described in Japanese Patent Provisional Publications 63-24555, 63-13282, 63-58763, and H6-212617); a carbonaceous material which is produced by heating a non-graphite type carbon at a temperature higher than 2,400° C. and has a X-ray diffraction peaks corresponding plural [002] faces (described in Japanese Patent Provisional Publication H5-182664); a mesophase carbonaceous material produced by a pitch firing process (described in Japanese Patent Provisional Publications H5-307957, H5-307958, H7-85862 and H8-315820); graphite having a coating layer (described in Japanese Patent Provisional Publication H6-84516); and other various carbonaceous materials such as granular, microsphere, plate, microfibrous and/or whisker carbonaceous materials, products obtained by firing of phenol resin, acrylonitrile resin, and/or furfuryl alcohol resin, and polyacene material having hydrogen atoms. Particularly preferred are carbonaceous materials described in Japanese Patent Provisional Publication H5-182664, carbonaceous materials of granular, microsphere, plate, fibrous and/or whisker forms, mesophase pitches, fired products of phenol resin and/or acrylonitrile resin, and polyacene material having hydrogen atoms.

The amorphous (i.e., non-crystalline) metal oxide can be employed in combination with one or more other amorphous metal oxide or with one or more crystalline metal oxides. The metal oxide (amorphous or crystalline) preferably contains one or more elements belonging to transition metals, halogen atoms, and atomic elements of groups 1, 2, 13, 14 and 15 of the Periodic Table. When the metal oxide is employed in combination with carbonaceous material, the carbonaceous material is preferably employed in a ratio of 10 to 70 wt. %, more preferably 20 to 50 wt. %.

Examples of the crystalline metal oxides include $Ag_2O$, $Ti_2O$, $Fe_2O_3$, MgO, $V_2O_5$, NiO, CuO, ZnO, $Mo_2O_3$, $In_2O_3$, SnO, $SnO_2$, $SnSiO_3$, and $In_2Sn_2O_7$. These metal oxides are converted into lithium-containing metal oxide by receiving lithium ions therein.

The negative electrode active material preferably contains tin oxide as a main component and, as a minor component, one or more elements selected from the group consisting of transition metal elements, halogen, and the elements belonging to the groups 1, 2, 13, 14 and 15 of the periodic table. The material can be prepared by electrochemically intercalating lithium ions into an amorphous negative electrode active material precursor of metal complex oxide having the following formula:

$$Sn_xM^1_{1-x}M^2_yO_z$$

In the above formula, "$M^1$" represents one or more elements selected from the group consisting of Mn, Fe, Pb and Ge; "$M^2$" represents two or more elements selected from the group consisting of Al, B, P, Si, halogen, and the elements belonging to the groups 1, 2 and 3 of the periodic table; and "x", "y" and "z" are numbers satisfying the conditions of $0<x\leqq 1.0$, $1\leqq y\leqq 3$ and $1<z\leqq 8$, respectively. Preferably, "$M^1$" represents one or more elements selected from the group consisting of Pb and Ge; and "$M^2$" represents two or more elements selected from the group consisting of B, P, Si, Na, K, Mg, Ca, Sr, and Ba.

The lithium ions are intercalated into the above precursor by electrically charging the battery precursor comprising the positive electrode active material, the negative electrode active material precursor, and a non-aqueous electrolyte containing lithium ions.

The above metal complex oxide (precursor) for the preparation of the negative electrode active material is characterized by being amorphous material. The term "amorphous material" in the invention means a material which gives a broad scattered band having its main peak in the range of 20° to 40° (in terms of 2θ) in X-ray diffraction using Cu-K α rays. In the scattered band, a diffraction line may be present. The diffraction line in the range of 40° to 70° (in terms of 2θ) preferably has an intensity as much as 500 times or less (more preferably as much as 100 times or less, and moreover as much as 5 times or less) than the diffraction line in the range of 20° to 40° (in terms of 2θ). Most preferably, there are present no diffraction lines representing a crystalline structure.

The negative electrode active material precursor can be prepared by the steps of: mixing a tin compound (Sn source) and compounds containing other elements; and then melting to cause a reaction of the mixture at 800 to 1,500° C. (preferably 900 to 1,200° C.) for 4 to 48 hours. The reaction is carried out under an atmosphere of inert gas such as nitrogen and argon. In the atmosphere, the partial pressure of oxygen is preferably controlled at not more than $10^{-1}$ atm, more preferably not more than $10^{-2}$ atm. The obtained product may be rapidly cooled at the rate of 50 to 500° C./minute so as to promote formation of amorphous structure. Otherwise, it may be slowly cooled to enhance the density of amorphous structure. Thus prepared glassy material is then pulverized to give grains having the mean grain size of 0.5 to 20 μm, preferably 1 to 10 μm.

The negative electrode active material precursor can be also prepared by solution reaction according to, for example, sol-gel method. The mean grain size of thus prepared material particle preferably is in the range of 0.1 to 10 μm, more preferably 0.2 to 5 μm (in terms of secondary particle size).

Preferred examples of the negative electrode active material precursors employable for the invention are concretely shown below:

| | |
|---|---|
| $SnSi_{0.8}P_{0.2}O_{3.1}$ | $SnSi_{0.5}B_{0.2}P_{0.2}O_{1.85}$ |
| $SnSi_{0.8}B_{0.2}O_{2.9}$ | $SnSi_{0.8}Al_{0.2}O_{2.9}$ |
| $SnSi_{0.6}Al_{0.1}B_{0.2}O_{1.65}$ | $SnSi_{0.3}Al_{0.1}P_{0.6}O_{2.25}$ |
| $SnSi_{0.4}B_{0.2}P_{0.2}O_{2.1}$ | $SnSi_{0.6}Al_{0.1}B_{0.5}O_{2.1}$ |
| $SnB_{0.5}P_{0.5}O_3$ | $SnK_{0.2}PO_{3.6}$ |
| $SnRb_{0.2}P_{0.8}O_{3.2}$ | $SnBa_{0.1}P_{1.45}O_{4.5}$ |
| $SnLa_{0.1}P_{0.9}O_{3.4}$ | $SnNa_{0.1}B_{0.45}O_{1.75}$ |
| $SnLi_{0.2}B_{0.5}P_{0.5}O_{3.1}$ | $SnCs_{0.1}B_{0.4}P_{0.4}O_{2.65}$ |
| $SnBa_{0.1}B_{0.4}P_{0.4}O_{2.7}$ | $SnCa_{0.1}Al_{0.15}B_{0.45}P_{0.55}O_{3.9}$ |
| $SnY_{0.1}B_{0.6}P_{0.4}O_{3.55}$ | $SnRb_{0.2}B_{0.3}P_{0.4}O_{2.55}$ |
| $SnCs_{0.2}B_{0.3}P_{0.4}O_{2.55}$ | $SnCs_{0.1}B_{0.4}P_{0.4}O_{2.65}$ |
| $SnK_{0.1}Cs_{0.1}B_{0.4}P_{0.4}O_{2.7}$ | $SnBa_{0.1}Cs_{0.1}B_{0.4}P_{0.4}O_{2.75}$ |
| $SnMg_{0.1}K_{0.1}B_{0.4}P_{0.4}O_{2.75}$ | $SnCa_{0.1}K_{0.1}B_{0.4}P_{0.5}O_3$ |
| $SnBa_{0.1}K_{0.1}Al_{0.1}B_{0.3}P_{0.4}O_{2.75}$ | $SnMg_{0.1}Cs_{0.1}Al_{0.1}B_{0.3}P_{0.4}O_{2.75}$ |
| $SnCa_{0.1}K_{0.1}Al_{0.1}B_{0.3}P_{0.4}O_{2.75}$ | $SnMg_{0.1}Rb_{0.1}Al_{0.1}B_{0.3}P_{0.4}O_{2.75}$ |
| $SnCa_{0.1}B_{0.1}P_{0.2}F_{0.2}O_{2.6}$ | $SnMg_{0.1}Cs_{0.1}B_{0.4}P_{0.4}F_{0.2}O_{3.3}$ |
| $Sn_{0.5}Mn_{0.5}Mg_{0.1}B_{0.9}O_{2.45}$ | $Sn_{0.5}Mn_{0.5}Ca_{0.1}P_{0.9}O_{3.35}$ |
| $Sn_{0.5}Ge_{0.5}Mg_{0.1}P_{0.9}O_{3.35}$ | $Sn_{0.5}Fe_{0.5}Ba_{0.1}P_{0.9}O_{3.35}$ |
| $Sn_{0.8}Fe_{0.2}Ca_{0.1}P_{0.9}O_{3.35}$ | $Sn_{0.3}Fe_{0.7}Ba_{0.1}P_{0.9}O_{3.35}$ |
| $Sn_{0.9}Mn_{0.1}Mg_{0.1}P_{0.9}O_{3.35}$ | $Sn_{0.2}Mn_{0.8}Mg_{0.1}P_{0.9}O_{3.35}$ |
| $Sn_{0.7}Pb_{0.3}Ca_{0.1}P_{0.9}O_{3.35}$ | $Sn_{0.2}Ge_{0.8}Ba_{0.1}P_{0.9}O_{3.35}$ |
| $SnAl_{0.1}B_{0.5}B_{0.5}P_{0.5}O_{3.15}$ | $SnCs_{0.1}Al_{0.4}B_{0.5}P_{0.5}O_{3.65}$ |
| $SnCs_{0.1}B_{0.5}P_{0.5}O_{3.05}$ | $SnCs_{0.1}Ge_{0.05}B_{0.05}P_{0.5}O_{3.15}$ |
| $SnCs_{0.1}Ge_{0.05}Al_{0.3}B_{0.5}P_{0.5}O_{3.60}$ | |

In order to intercalate lithium ions into the above precursor, a lithium ion source for intercalation is placed in the battery precursor. Examples of the lithium ion source for intercalation include lithium metal and lithium metal alloy. The lithium ion source works by no means as the electrode active material.

The electrodes are formed from electrode mixtures comprising the electrode active material. Each of the electrode mixtures for the positive electrode and the negative electrode may contain electroconductive material, binder, and filler, in addition to the electrode active material.

As the electroconductive materials, electro-conductive materials which are chemically stable in the battery are employed. Concrete examples of the materials include naturally produced graphite (e.g., flake graphite and massive graphite), synthetic graphite, carbon black, acetylene black, ketchen black, carbonaceous fibers, powder of metal (e.g., copper, nickel, aluminum, or silver), metal fibers, and polyphenylene derivatives. These materials can be employed singly or in combination. Particularly preferred is a combination of graphite and acetylene black. The amount of the electro-conductive material incorporated into the electrode material generally is not more than 50 wt. %, preferably 1 to 50 wt. %, more preferably 2 to 30 wt. %. When carbon or graphite is employed, its amount preferably is in the range of 2 to 15 wt. %.

Examples of the binders include polysaccharides, thermoplastic resin, and elastic polymers, such as starch, polyvinyl alcohol, carboxymethyl cellulose, hydroxypropyl cellulose, regenerated cellulose, diacetyl cellulose, polyvinyl chloride, polyvinyl pyrrolidone, tetrafluoroethylene, polyfluorinated vinylidene (polyvinylidene fluoride), polyethylene, polypropylene, ethylene-propylene-diene terpolymer (EPDM), sulfonated EPDM, styrene-butadiene rubber, polybutadiene, fluorinated rubber, and polyethylene oxide. These materials can be employed singly or in combination. The amount of the binder preferably is in the range of 2 to 30 wt. %.

As the fillers, any fibrous materials which are chemically stable in the battery can be employed. Concrete examples of the materials include fibers of olefin polymers such as polypropylene and polyethylene, glass material, and carbonaceous materials. The filler can be included in an amount of not more than 30 wt. %.

The non-aqueous electrolyte employable for the battery of the invention comprises a non-protonic organic solvent and a lithium salt (namely, electrolyte) soluble in the solvent. Examples of the organic solvents include propylene carbonate, ethylene carbonate, butylene carbonate, dimethyl carbonate, diethyl carbonate, γ-butylol-actone, 1,2-dimethoxyethane, tetrahydrofurane, 2-methyl-tetrahydrofurane, dimethyl sulfoxide, 1,3-dioxolane, formamide, dimethyl formamide, dioxolane, acetonitrile, nitromethane, methyl formate, methyl acetate, phosphoric triester, trimethoxymethane, dioxolane derivatives, sulforane, 3-methyl-2-oxazolidione, propylene carbonate derivatives, tetrahydrofurane derivatives, diethyl ether, and 1,3-propane sultone. These solvents can be employed singly or in combination.

Examples of the lithium salts include $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium salts of lower aliphatic carboxylic acids, $LiAlCl_4$, LiCl, LiBr, LiI, chloroborane lithium, and lithium tetraphenyl borate. These lithium salts can be employed singly or combination.

Preferred is an electrolytic solution of $LiCF_3SO_3$, $LiClO_4$, LiBF6 and/or $LiPF_6$ which is dissolved in a mixture of propylene carbonate or ethylene carbonate with 1,2-dimethoxyethane and/or diethyl carbonate. In the mixture, propylene carbonate or ethylene carbonate is mixed with 1,2-dimethoxyethane and/or diethyl carbonate preferably in the ratio of 0.4/0.6 to 0.6/0.4. 1,2-dimethoxyethane and diethyl carbonate are preferably mixed in a ratio in the range of 0.4/0.6 to 0.6/0.4. The concentration of the electrolyte preferably is in the range of 0.2 to 3 moles per one litter of the electrolytic solution.

In order to improve the cycle capacity retention of the secondary battery, it is particularly preferred for the electrolytic solution to comprise $LiPF_6$ (as lithium salt) dissolved in a solvent of ethylene carbonate or a mixed solvent of ethylene carbonate with diethyl carbonate or dimethyl carbonate.

The electrolytic solution can contain one or more organic solid electrolytes. Examples of the employable organic solid electrolytes include polyethylene oxide derivatives, polymers having polyethylene oxide unit, polypropylene oxide derivatives, polymers having poly-propylene oxide unit, polymers having ion releasable group, a mixture of a polymer having ion releasable group and the aforementioned non-protonic electrolyte, and phosphoric ester polymers. The electrolytic solution may contain polyacrylonitrile. Also known is a combination of inorganic and organic solid electrolytes, as described in Japanese Patent Provisional Publication 60-1768.

The separator is an electro-insulating thin film having a high ionic permeation rate and an appropriate physical strength. For instance, a film sheet or non-woven sheet made of an olefinic polymer such as polypropylene and polyethylene, or glass fiber can be employed. The pore size of the separator generally is in the range of 0.01 to 10 $\mu$m. The thickness of the separator generally is in the range of 5 to 300 $\mu$m.

If a solid electrolytic material such as polymer is employed as the electrolyte, the electrolyte can serve as the separator.

The electrolytic solution can further contain one or more materials described below, for improving charge-discharge characteristics: pyridine, triethyl phosphite, triethanolamine, cyclic ethers, ethylene diamine, n-glyme, triamide hexaphosphate, nitrobenzene derivatives, sulfur, quinoneimine dyes, N-substituted oxazolidinone, N,N'-substituted imidazolidinone, ethylene glycol dialkyl ether, quaternary ammonium salts, polyethylene glycol, pyrrole, 2-methoxyethanol, aluminum trichloride, electro-conductive polymer, monomers of electrolyte active materials, triethylene phosphoneamide, trialkylphosphine, morpholine, aryl compounds having carbonyl group, hexamethylphosphoric triamide, 4-alkylmorpholine, bicyclic tertiary amines, oils, quaternary phosphonium salts, and tertiary sulfonium salts. A halogen-containing solvent such as carbon tetrachloride or trifluorinated chlorinated ethylene can be incorporated into the electrolytic solution so as to render the battery incombustible. Carbon dioxide gas may be incorporated into the electrolytic solution to improve the secondary battery in its resistance in high temperature storage.

Each of the positive electrode mixture and the negative electrode mixture may further contain supporting electrolyte such as ion-conductive polymer, nitromethane, electrolytic solution as described in Japanese Patent Provisional Publication 48-36633.

The surface of the positive electrode active material can be modified. For instance, the surface of the lithium-containing nickel metal complex oxide is treated with an esterifying agent or a chelating agent, or is coated with an electro-conductive polymer or polyethylene oxide. The surface of the negative electrode active material can be also modified, for instance, by coating its surface with an ion conductive polymer or a poly-acetylene layer, or it may be treated with a lithium salt.

As the collector, any electroconductive materials which are chemically stable in the battery can be employed. Concrete examples of the materials for positive electrode collector include stainless steel, nickel, aluminum, titanium, fired carbon, and stainless steel or aluminum whose surface is treated with carbon, nickel, titanium or silver. Concrete examples of the materials for negative electrode collector include stainless steel, nickel, copper, aluminum, titanium, fired carbon, Al—Cd alloy, and stainless steel or aluminum whose surface is treated with carbon, nickel, titanium or silver. The surface of the above material may be oxidized.

The collector can be produced in various forms such as foil, sheet, film, net, punched sheet, lath, porous body, foaming body and mold of fibers. The thickness of the collector is not particularly restricted, but generally in the range of 5 to 100 μm.

The non-aqueous lithium ion secondary battery of the invention can be produced in various forms such as coin form, button form, sheet, cylinder and square form. In the manufacture of the battery of coin form or button form, the electrode mixture comprising the active material and the above-mentioned materials is molded under pressure to give a pellet. On the other hand, in the manufacture of the battery of sheet, cylinder or square form, the electrode mixture is coated on the collector, and then dehydrated, dried, and pressed to give a sheet. The pressed dry sheet preferably has a thickness of 10 to 500 μm.

The lithium ion secondary battery (i.e., non-aqueous lithium ion secondary battery) of the invention can be utilized in various products and devices. Examples are handy personal computers (color or monochromatic), personal computers for imputing with pen, palm-top personal computers, notebook-type word processors, handy word processors, players for electronically playable book, handy phones, cordless phones (separated phones), pagers, handy terminals, handy facsimiles, handy duplicating machines, handy printers, head-phone stereos, video movies, liquid crystal television sets, handy cleaners, portable CD players, mini-disk players, electric shavers, electronic interpreters, phones for automobiles, transceivers, electrically actuator tools, electronic pocket notes, electronic calculators, memory cards, tape recorders, radio sets, and back-up electric sources. The secondary battery is also employable for motor cars, electric cars, motors, illuminating devices, toys, machines for amusement game, road conditioners, iron devices, watches, strobes, cameras, medical equipments (pace maker, hearing aids, massaging devices, etc.). The secondary battery is further employable in the field of space technology and military area. The secondary battery can be employed in combination with other electric sources such as solar battery.

The present invention is further described by the following non-restrictive examples.

EXAMPLE 1

(I) Synthesis of Metal Complex Oxide (Negative Electrode Active Material Precursor) according to Melting Method (1) $SnB_{0.5}P_{0.5}O_3$ (Compound A-1)

SnO (67.4 g), $B_2O_3$ (17.4 g), and $Sn_2P_2O_7$ (102.8 g) were mixed and pulverized in an automatic mortar. The pulverized mixture was placed in an alumina crucible and fired at 1,000° C. for 10 hours under argon gas atmosphere. After the firing was complete, the mixture was cooled rapidly at the rate of 100° C./min., to give the negative electrode active material precursor of $SnB_{0.5}P_{0.5}O_3$ (compound A-1) as transparent yellowish glass. The X-ray diffraction measurement using Cu-α rays indicated a broad scattered band in the range of 20° to 35° (in terms of 2θ), but no diffraction lines to be assigned to any crystal structures were observed, and thereby the obtained oxide was found to be amorphous.

(II) Preparation of Positive Electrode Active Material (1) $LiNi_{0.8}Mn_{0.2}O_2$ (Compound C-1)

Powders of $LiOH.H_2O$, $Ni(OH)_2$ and $MN(OH)_2$ (molar ratio of 1:0.8:0.2) were place in a mortar, and well mixed in dry air atmosphere. The mixture was fired in oxygen gas atmosphere at 650° C. for 6 hours, and then further fired at 750° C. for 8 hours. Thus, the desired oxide (compound C-1) was prepared. The prepared oxide was found to have a primary particle size of 0.3 μm (mean grain size) and a secondary particle size of 7 μm (mean grain size), and the shapes of the particle were almost sphere. BET specific surface area was 0.7 $m^2$/g. According to X-ray diffraction measurement, the ratio of the diffraction intensity assigned to (104) face based on that assigned to (003) face was 0.6, and the lattice constants were 2.83 (a-axis) and 13.89 (c-axis). Five grams of the prepared oxide was dispersed in 100 mL of pure water and pH value of the dispersion was measured (pH 10.5).

The above procedures were repeated using independently $LiNO_3$ and $LiCO_3$ in place of $LiOH.H_2O$, and using $NiCO_3$ in place of $Ni(OH)_2$, to give the above-mentioned compound C-1.

(2) $LiNi_{0.95}Al_{0.05}O_2$ (Compound C-2)

The above procedures were repeated using $Al(OH)_3$ in place of $MN(OH)_2$, to give $LiNi_{0.95}Al_{0.95}O_2$ (compound C-2).

(3) $LiNi_{0.8.}Mn_{0.2}O_{1.9}F_{0.2}$ (Compound C-3)

The above procedures were repeated using LiF in addition to the materials, to give $LiNi_{0.8}Mn_{0.2}O_{1.9}F_{0.2}$ (compound C-3).

(4) $LiCoO_2$ (Comparison Compound 1)

Lithium carbonate and a mixture of $Co_3O_4$ and $Co_2O_3$ were mixed so that the molar ratio Li/Co was set to 1.05. The mixture was fired in air atmosphere at 600° C. for 4 hours, and then further fired at 880° C. for 8 hours. Thus the desired metal oxide (comparison compound 1) was prepared.

(5) $Li_{1.05}Mn_{1.95}Co_{0.05}O_4$ (Comparison Compound 2)

LiOH, cobalt carbonate and chemically synthesized manganese dioxide (CMD) were mixed in the stoichiometric amount of the desired compound. The mixture was fired isn air atmosphere at 700° C. for 18 hours. Thus the desired metal oxide (comparison compound 2) was prepared.

(III) Preparation of Electrode Mixture Sheet (1) Positive Electrode Mixture Sheet The compound C-1 (90 wt. %), acetylene black (6 wt. %) and a binder (composition of 3 wt. % of polytetrafluoroethylene in water and 1 wt. % of sodium polyacrylate) were kneaded after addition of water. The resulting slurry was coated on both sides of an aluminum film (thickness: 30 μm). The coated film was dried and pressed to give the desired positive electrode mixture sheet (amount of coated slurry: approximately 230 g/$m^2$, coated layer thickness: approximately 90 μm).

(2) Negative Electrode Mixture Sheet

The compound A-1 (negative electrode active material precursor, 86 wt. %), flake graphite (3 wt. %), acetylene black (6 wt. %) and a binder (composition of 4 wt. % of styrene-butadiene rubber in water and 1 wt. % of carboxyethyl cellulose) were kneaded, after addition of water, by means of a homogenizer at 10,000 r.p.m. for more than 10 minutes of the resulting slurry was coated on both sides of a copper film (thickness: 18 μm). The coated film was dried and pressed to give the desired negative electrode mixture sheet (the amount of coated slurry: approximately 70 g/$m^2$, coated layer thickness: approximately 30 μm).

The surface of the resultant sheet was further coated with the mixture comprising flake graphite and aluminum oxide in the ratio of 1:4 by weight. Thus the negative electrode mixture sheet having a protective layer (average thickness: 5 μm) was prepared.

(IV) Preparation of Secondary Battery of Cylinder Form [Battery Precursor Using the Compound C-1]

A sheet of lithium metal foil (thickness: 35 μm) was cut into strips (width: 5 mm, length: 37 mm). In dry air atmosphere (dew point: −60° C.), the strips were placed in parallel at 2 mm intervals on both sides of the above negative electrode mixture sheet, and then pressed to attach by means of a pressing roller. The amount of the attached lithium metal was approximately 110 mg. Thus equipped lithium metal strips supply lithium ions intercalated into the negative electrode active material precursor, to convert the precursor into the active material.

The positive electrode mixture sheet obtained above was cut to give a strip having a width of 35 mm, and the negative electrode mixture sheet having the lithium metal strips was cut to give a strip having a width of 37 mm. To the ends of respective sheets were spot-welded leading plates of aluminum and nickel, respectively, and dehydrated and dried at 150° C. for 2 hours in a dry atmospheric condition of a dew point of −40° C.

Both electrode sheets were installed in a nickel-plated iron cylinder battery container, in the manner as illustrated in the attached figure. The dehydrated dry positive electrode sheet 8, a separator of porous poly-propylene film 10 (Cellgard 2400, available from Cellanese Corporation), the dehydrated dry negative electrode sheet 9, and another separator 10 were overlaid in this order, and then rolled by means of a mechanical winder. The obtained roll was put in the container 11 which also served as the negative electrode terminal. In the container, an electrolytic solution of 1 mole of $LiPF_6$ in one liter of a mixture of ethylene carbonate, butylene carbonate and dimethyl carbonate (2:2:6, volume ratio) was placed. The battery cap 12 was then fixed via a gasket 13. The positive electrode terminal 12 and the positive electrode mixture sheet 8, as well as the negative -electrode mixture sheet 9 and the container 11, were connected to each other.

The resulting battery composition (which was a battery precursor) had a diameter of 14 mm and a height of 50 mm. The battery precursor was equipped with a safety valve 14.

Thus, a battery precursor using the compound C-1 as positive electrode active material was prepared.

[Battery Precursor using the Compound C-2]

The above procedures were repeated using the compounds C-2 in place of the compounds C-1, to prepare a battery precursor using the compound C-2 as positive electrode active material.

[Battery Precursor Using the Compound C-3]

The above procedures were repeated using the compounds C-2 in place of the compounds C-1, to prepare a battery precursor using the compound C-3 as positive electrode active material.

[Preparation of Lithium Ion Secondary Batteries]

Each of the above prepared battery precursors was allowed to stand for 12 hours at room temperature, and then was preliminarily charged at 0.1 A for 1 hour. The battery precursor was then aged at 50° C. for 10 days. After the aging, it was confirmed that the lithium metal strips attached on the negative electrode mixture sheet was dissolved to supply lithium ions and the ions were intercalated into the negative electrode precursor, and thereby the battery precursor was turned into the lithium ion secondary battery.

The procedures above described were repeated except for using independently cobalt oxide and manganese oxide as positive electrode active material, to prepare lithium ion secondary batteries for comparison (comparison-1 and comparison-2).

(V) Evaluation of Lithium Ion Secondary Battery

Each of the above prepared batteries was charged at 2 $mA/cm^2$ to 4.2 V at room temperature. Thus activated batteries were then aged at 55° C. for 3 days.

Each battery was then evaluated in its discharge capacity by repeated charge-discharge cycle under the conditions that the voltage at which the charge was terminated at 4.2 volts, the voltage at which the discharge was terminated at 2.8 volts, and electric currents for the charge-discharge were 2 $mA/cm^2$ (i.e., 0.2 C).

The cycle capacity retention of each battery was also evaluated in the following manner: the battery was subject to 100 times repeated charge-discharge cycles (electric current: 10 $mA/cm^2$ (i.e., 1.0 C)), and then the ratio of the discharge capacity (electric current: 0.2 C) based on the initial capacity was measured to evaluate the cycle capacity retention.

The results are set forth in Table 1.

TABLE 1

| Positive electrode | Discharge capacity (Ah) | Cycle capacity retention (%) |
|---|---|---|
| Comparison-1 | 1.00 | 88 |
| Comparison-2 | 0.89 | 87 |
| Compound C-1 | 1.10 | 90 |
| Compound C-2 | 1.12 | 92 |
| Compound C-3 | 1.10 | 94 |

The results shown in Table 1 indicate that the lithium ion secondary batteries of the invention are superior in the discharge capacity and cycle capacity retention to the referential battery comprising cobalt oxide or manganese oxide as positive electrode active material.

EXAMPLE 2

(1) Preparation of Battery and Test Conditions

A mixture of SnO and $SiO_2$ was fired to 1,200° C. for 12 hours in gaseous argon atmosphere by the fusion/rapid cooling method described in Example 1, to produce an amorphous glassy product having a formula of $SnSiO_3$. The glassy product was pulverized in a vibrator mill to give a negative electrode active material precursor (compound A-2) having a mean particle size of 3 μm and a specific surface area of 3 $m^2/g$. The compound A-2 was mixed with a natural graphite carbon powder in various ratios in the range of 0.5/9.5 to 8/2 (graphite carbon powder/compound A-2, by weight). Each of the resulting mixtures was further mixed with 5 wt. % of PVDF (polyvinyldene fluoride, binder) and subsequently dispersed in N-methyl-2-pyrrolidone by a homogenizer in the same manner as in Example 1 to give a negative electrode slurry. The resulting slurry was uniformly coated on both sides of a copper collector sheet to give a negative electrode sheet having coated electrode layers on both sides (coated amount: 40–80 $g/m^2$).

The negative electrode sheet was not coated with a protective layer and not electrochemically intercalated with lithium ions from deposited lithium metal. The negative electrode sheet was wound together with the positive electrode sheet having the coated compound C-1 layers (prepared in Example 1), and placed in a cylinder case. An electrolyte solution was introduced into the cylinder case to prepare a battery of cylinder type having a structure illustrated in the attached figure.

The battery was charged to give a voltage of 4.2 V by application of an electric current at 2 $mA/cm^2$. Thus charged battery was aged at 55° C. for 3 days for activating the battery. Thereafter, the battery was repeatedly subjected to discharging-charging cycle under the conditions of charging termination voltage of 4.2 V, discharging termination voltage of 2.8 V, and a current density of 2 $mA/cm^2$.

(2) Test Results

The following table 2 shows the electric current capacity (i.e., discharge capacity) and energy capacity in the first cycle and the cycle capacity retention after 100 cycles.

TABLE 2

| Negative electrode Carbon/A-2 | Discharge capacity (Ah) | Energy capacity (Wh) | Cycle capacity retention (%) |
|---|---|---|---|
| 0.5/9.5 | 0.77 | 2.58 | 80 |
| 1/9 | 0.98 | 3.33 | 85 |
| 2/8 | 1.10 | 3.75 | 90 |
| 4/6 | 1.05 | 3.70 | 91 |
| 5/5 | 1.00 | 3.60 | 92 |
| 7/3 | 0.90 | 3.30 | 94 |
| 8/2 | 0.70 | 2.50 | 94 |

The results set forth in Table 2 indicate that the electric current capacity (i.e., discharge capacity) was high in the carbonaceous material/metal oxide ratio in the range of 1/9 to 7.3, and particularly high in the range of 2/8 to 5/5.

What is claimed is:

1. A non-aqueous lithium ion secondary battery which comprises a positively electrode comprising an active material of lithium-containing metal complex oxide, a negative electrode comprising amorphous metal complex oxide, and a non-aqueous electrolyte, wherein the lithium-containing metal complex oxide is a lithium-containing nickel metal complex oxide of the following formula:

$$Li_xNi_{1-y}M_yO_{2-z}X_a$$

wherein M represents at least one element selected from the group consisting of Mg, B, Al, Sn, Si, Ga, Mn, Fe, Ti, Nb, Zr, Mo and W; X is a halogen atom; x, y, z and a are numbers satisfying the conditions of $0.2<x\leqq 1.2$, $0\leqq y\leqq 0.5$, $0.01\leqq z\leqq 0.25$, and $0.02\leqq a\leqq 0.5$, respectively.

2. The non-aqueous lithium ion secondary battery of claim 1, wherein the amorphous metal complex oxide comprises a major amount of tin oxide and a minor amount of at least one element selected from the group consisting of transition metal elements, halogen, Na, K, Mg, Ca, Sr, Ba, B, Al, Ga, In, Si, Ge, Sn, Pb, P, As, Sb and Bi.

3. A non-aqueous lithium ion secondary battery which comprises a positive electrode comprising an active material of lithium-containing metal oxide, a negative electrode comprising carbonaceous material and at least one metal complex oxide, and a non-aqueous electrolyte, wherein the lithium-containing metal oxide is a lithium-containing nickel metal complex oxide of the following formula:

$$Li_xNi_{1-y}M_yO_{2-z}X_a$$

wherein M represents at least one element selected from the group consisting of Mg, B, Al, Sn, Si, Ga, Mn, Fe, Ti, Nb, Zr, Mo and W; X is a halogen atom; x, y, z and a are numbers satisfying the conditions of $0.2<x\leqq 1.2$, $0<y\leqq 0.5$, $0.01\leqq z\leqq 0.25$, and $0.02\leqq a\leqq 0.5$, respectively.

4. The non-aqueous lithium ion secondary battery of claim 3, wherein the carbonaceous material is contained in the negative electrode in an amount of 10 to 70 weight %.

5. The non-aqueous lithium ion secondary battery of claim 3, wherein the carbonaceous material is contained in the negative electrode in an amount of 20 to 50 weight %.

6. The non-aqueous lithium ion secondary battery of claim 3, wherein the metal complex oxide comprises at least two metal complex oxides.

7. The non-aqueous lithium ion secondary battery of claim 3, wherein the metal complex oxide comprises at least one crystalline metal complex oxide and at least one amorphous metal complex oxide.

* * * * *